(12) United States Patent
Bolton et al.

(10) Patent No.: US 8,288,007 B1
(45) Date of Patent: Oct. 16, 2012

(54) TRANSPARENT LAMINATING RESINS

(75) Inventors: Nelson Bolton, Trumbauersville, PA (US); Edwin Bolton, Trumbauersville, PA (US); W. Novis Smith, Philadelphia, PA (US); Elizabeth Wimmer, Palm, PA (US)

(73) Assignee: AGP Plastics, Inc., Trumbauersville, PA (US)

( * ) Notice: Subject to any disclaimer, the term of this patent is extended or adjusted under 35 U.S.C. 154(b) by 344 days.

(21) Appl. No.: 12/455,330

(22) Filed: Jun. 1, 2009

(51) Int. Cl.
*B32B 17/20* (2006.01)

(52) U.S. Cl. ........ 428/442; 428/163; 428/441; 156/104; 156/106

(58) Field of Classification Search ................... 428/442, 428/163, 441; 156/106, 104
See application file for complete search history.

(56) References Cited

U.S. PATENT DOCUMENTS

| | | | | |
|---|---|---|---|---|
| 4,668,574 A | * | 5/1987 | Bolton et al. | 428/339 |
| 5,763,062 A | * | 6/1998 | Smith et al. | 428/215 |

* cited by examiner

*Primary Examiner* — Peter D. Mulcahy
*Assistant Examiner* — Henry Hu
(74) *Attorney, Agent, or Firm* — John Lezdey

(57) ABSTRACT

The invention relates to security glass laminates having high strength and impact resistance. The laminates consist of a pane of glass sheets with an ionomer interlayer. The ionomer consists of at least 17% by weight of acrylic acid groups which have been neutralized with a lithium salt.

7 Claims, No Drawings

TRANSPARENT LAMINATING RESINS

FIELD OF THE INVENTION

The present invention relates to improved transparent laminating resins for security windows for homes and windshields for vehicles with maximum impact resistance and high strength. The resin comprises an ionomer neutralized with lithium salts or lithium and sodium salts.

BACKGROUND OF THE INVENTION

The use of glass for hurricane windows, security windows, windshields, automobile sidelights, heated windows, and situations where the window is under pressure or could be struck requires that the glass window be laminated to a clear plastic interlayer. A number of these clear plastic materials in sheet form have been developed including polyvinyl butyral (PVB) which is currently the most widely used laminating plastic for automotive windshields and related applications. Alphatic polyurethanes are widely used in aircraft windshields and many military applications, and more recently ionomers which are partially neutralized copolymers of ethylene and acrylic or methacrylic acid are being used for security windows, hurricane glass, bullet resistant glass and any situation requiring high strength and high impact resistance. A significant requirement of all of these clear laminating resins for glass is that they must be inherently stable to sunlight without yellowing which means very little absorption of UV below 380 nm. These materials also must be optically clear.

The growth in demand for increased impact resistance and strength for security and protection along with the need to reduce the weight of glass windows in automobiles, structures, other weight and energy sensitive applications has driven the need to increase the impact strength properties and tensile strength of the finished glass laminate even more. The ionomer class of clear laminating resins has been steadily growing over the past decade with several new products such as Dupont's Sentry 21 which is a sodium neutralized copolymer of ethylene and about 19% methacrylic acid and neutralized to about 25%. Another such product is Noviflex which is a combined sodium and diamine neutralized copolymer of ethylene and about 15% methacrylic acid.

Although these laminating resins perform satisfactory for current applications, most transparent structures utilizing them are made thicker and heavier than desired to gain this performance. Weight saving is always desired with these heavy glass laminates.

Therefore, there is a need for further increasing the adhesion of the glass to the clear plastic laminating layer to the glass to achieving even greater impact resistance of the total glass sandwich laminate by resisting delamination of the composite window under load or high impact in order to reduce the needed weight of the laminate to meet the requirements for the application. In addition, there is a need to also increase the tensile strength of the clear plastic laminating layer to further provide increased impact resistance and strength of the glass window laminate or composite, and to achieve the maximum stiffness and tensile strength and therefore impact resistance per given area weight of the composite. Any improvements in one or both of these properties will permit weight reductions in current laminate configurations or permit higer impact ratings and performance for these higher impact higher strength laminates/composites.

U.S. Pat. No. 5,002,820 to Bolton et al, which is herein incorporated by reference discloses laminated safety glass having thick glass and intermediate film layers which prevent spall larger pieces on impact.

The use of so-called safety glazing or penetration resistant glazing for windows, windshields, and the like using multiple layers of polycarbonate, glass and other resinous materials is well known. For example, glass-polycarbonate resin laminates are described in U.S. Pat. Nos. 4,663,228 and 3,666,614.

In U.S. Pat. No. 3,520,768 there are described laminates of relatively thick glass having a comparatively thin polycarbonate film as the adhesive layer. While generally useful, these laminates suffer from an inability to withstand multiple shots, especially when struck by high velocity bullets such as those fired from rifles. Thus, for example, in prior art laminates utilizing thick forward-facing (impact receiving) glass layers, multiple shots at the thick glass front layer cause much glass cracking and removal of the glass from the laminated structure, making it vulnerable to repeat hits. In order to withstand the repeated hits, the laminates had to be extremely thick and heavy. Even these thick and heavy laminates are not entirely successful, since spalling on the back side or downstream face of said laminates occurred with the resultant danger of injury due to this spalling to persons behind these laminates.

U.S. Pat. No. 4,125,669 to Triebel et al discloses a laminated safety glass which utilizes a thick outside layer of silicate glass which is bonded to a polycarbonate pane of at least 1.5 mm thick.

U.S. Pat. No. 4,312,903 to Molari discloses impact resistant, double glazed structures comprising a plurality of laminae selected from polycarbonate, glass and solid resinous materials. The glass laminae faces the direction of impact and has a thickness from about 30 to 220 mils. The structure utilizes relatively thick outward layers and relatively thin inward layers.

SUMMARY OF THE INVENTION

According to the invention there is provided a security glass laminate having high strength and high impact resistance. The security glass laminate comprises one or more layers of front and rear tempered or chemically strengthened glass sheets which are separated by an ionomer inter layer. The inter layer is essentially free of crystallinity and consists of sodium and lithium salts neutralized ionomer or lithium alone neutralized ionomer having a melt index of 0.2 to 4. The ionomer consists of at least 17% by weight of acrylic acid or methacrylic acid groups which have been neutralized from 15 to 40% of the free carboxyl groups available with a lithium salt containing less than 1% lithium carbonate or a combination of at least 10 mole % of the lithium salt combined with a sodium salt and copolymerize with a polyolefin essentially ethylene and the salts may be hydroxide, acetate or formate.

Advantageously the ionomer composition comprises at least 19% by weight of the acrylic, methacrylic or combination of acrylic and methacrylic acid.

It is therefore an object of the invention to provide a security laminate having high impact resistance and high strength having good optical clarity.

It is another object of the invention to provide security glass having a UV absorption below 380 nm.

Advantageously, the ionomer is also crosslinked with a diamine.

DESCRIPTION OF THE PREFERRED EMBODIMENTS

In accordance with the invention there is provided improved transparent security glass laminate comprising one or more layers of front and rear tempered or chemically strengthened glass sheets having an inner layer of an ionomer having improved tensile strength and is free of crystallinity. The ionomer is partially neutralized with lithium or lithium and sodium salts. The ionomer consists of copolymers of ethylene and acrylic acid or methacrylic acid. The interlayer consists of sodium and lithium salts or lithium alone neutralized ionomer having a melt index of about 0.3 to 4, at least 17% by weight of said ionomer consists of acrylic acid or methacrylic acid groups which have been neutralized to 15 to 40% of the free carboxyl groups available with a lithium salt containing less than 1% lithium carbonate or a combination of at least 10 mole % of the lithium salt combined with a sodium salt.

The adhesion of the ionomer plastic or resin laminating layer to the glass sheets is a function of the effectively accessible free carboxyl groups on the surface of the partly neutralized ionomer laminating layer which are available to react or hydrogen bond to the glass surface containing sodium and calcium cations. The reaction of the free carboxyl group on the ionomer surface to the calcium cation (calcium sodium silicate) which is divalent and forms particularly strong bonds to carboxyl groups is most important in determining factor for the adhesion of the ionomer resin laminating layer to the glass. There are other factors including the cleanliness of the glass, priming the glass surface, presence or absence of tin oxide, but the ultimate bonding strength is limited by the concentration of carboxyl groups on the surface of the ionomer laminating resin to participate in the chemical bonding to the glass. Chemical bonding is the strongest of all forces in bonding two layers together. The measurement of adhesion in glass laminates is commonly measured by the Ball Drop test. The higher the number (the higher the ball drop distance) before delamination occurs, the better the adhesion of the laminating plastic layer to the glass. Current hurricane glass laminates using ionomers achieve about 6 at best. An improvement to 8 or more would be a major improvement allowing a much higher impact rating or a significant reduction in weight and thickness.

The overall tensile strength and stiffness of the partly neutralized sodium ionomer resins is dependent on the degree of neutralization of the carboxyl groups contained and the amount of carboxylic acid groups contained. This is methacrylic acid in the case of the current commercial ionomer glass laminating layers and which ranges from about 14-20% by weight of the copolymer in these products). In order to achieve the maximum stiffness and tensile strength and yet be able to process the resulting very low melt index polymer (0.5-2) through a sheet extruder which are very stiff without "burning" the polymer and to have a practical through put for the extruder, the neutralization has been about 55-63% of the contained acid groups for the copolymer containing about 14-15% methacrylic acid (Dupont 8920). The percent neutralization for a copolymer containing about 19-20% methacrylic acid by weight is about 29% (Dupont 8940). The degree of neutralization is a tradeoff between achieving the maximum tensile strength with increasing stiffness (modulus) and process ability. The degree of neutralization is empirically determined by trying to maintain balancing out-processibility with increased tensile strength and stiffness. (The melt index decreases with increased neutralization and the polymer becomes harder to process as its viscosity increases despite higher extrusion temperatures). The overall impact resistance of the glass laminate made with the laminating layer is usually measured by the Pummel test. In this test, the adhesion, the modulus, and the tensile strength interact to contribute to total impact resistance. Increasing the performance in this test, results in increased performance with respect to hurricane resistance and ballistic resistance.

For optically clear partially neutralized ionomer resins for glass lamination, it has been shown that the higher the contained acrylic or methacrylic acid groups by weight the more resistant to crystallization (haze formation) when the resin layer is heat laminated with glass (up to 400° F.) and then cooled. The minimum amount of these groups is 14-15% providing a diamine is present. However, the partly neutralized ionomer resins on their own remain clear through the laminating cycle if the minimum contained acrylic or methacrylic acid is increased up to >18% by weight.

If the amount of neutralization required for the required high tensile strength requires increased neutralization although still processable, the amount of free acid groups are reduced thus reducing the adhesion. Therefore the adhesion properties and tensile and modulus properties for the partly neutralized ionomer glass laminating resins are dependent on the amount of contained free carboxyl groups in the polymer and the degree of neutralization.

It is desirable to increase the tensile and modulus properties of the partially neutralized ionomer while maintaining or increasing the adhesion of the ionomer laminating layer. The properties of the partially neutralized ionomer resins could be further enhanced if the tensile strength and the modulus increased while at the same time achieving maintaining a higher number of free carboxyl groups than are currently available.

All optically clear glass laminating resins to date have been made with sodium neutralization. It is known that lithium cation produces higher tensile and greater modulus per degree of neutralization, but it has only been used in applications such as golf ball covers. It has not been used for optically clear resin requirements such as the glass laminating resins because the lithium neutralized resins have sufficient haze as to be undesirable. We have found that this is due to the small amounts of lithium carbonate which are always present in lithium hydroxide (about 0.5% by weight of contained lithium hydroxide monohydrate crystal). When the lithium hydroxide is converted to lithium acetate preferably as a solution the resulting solution when used for reacting with the partially neutralized or unneutralized copolymers of ethylene and acrylic or methacrylic acid 17% or higher, optically clear lamininating resins can be produced with enhanced adhesion and tensile strength and modulus. The lithium acetate is best used in combination with the sodium neutralization so that the properties can be more readily adjusted. Higher tensile strengths and high moduli are obtained than with an all sodium neutralization at the same or lower levels of neutralization.

Further we find that using acrylic acid copolymers of ethylene at about 19-20% acrylic acid by weight actually contain more free carboxyl groups than the corresponding methacrylic acid copolymers (Dupont) of equal copolymer weight by about 19% due to the lower molecular weight of the acrylic acid moiety compared to that of the methacrylic acid moiety.

By using acrylic acid/ethylene copolymers and with partial lithium neutralization, a significant increase in free carboxyl groups for adhesion can be achieved while at the same achieving the high stiffness and tensile strengths required. The overall performance of this new group of ionomers achieves higher results in the ball drop test and the pummel tests.

Publications, patent applications, patents and other references mentioned herein are incorporated by reference in their entirety.

Unless stated otherwise, all percentages, parts, ratios, etc., are by weight. Use of "a" or "an" to describe elements and components includes one or at least one and the singular also includes the plural unless it is obvious that it is meant otherwise.

The term "(meth)acrylic", as used herein, alone or in combined form, such as "(meth)acrylate", refers to acrylic and/or methacrylic, for example, acrylic acid and/or methacrylic acid, or alkyl acrylate and/or alkyl methacrylate.

The ionomeric sheets useful for the laminate interlayer comprise a polymer with a modulus between 20,000 psi (138 MPa) and 100,000 psi (690 MPa), preferably with a modulus between about 25,000 psi (173 MPa) and about 90,000 psi (621 MPa), and more preferably with a modulus between about 30,000 psi (207 MPa) and about 80,000 psi (552 MPa), as measured by ASTM Method D-638.

The ionomer sheets used in the high strength multilayer laminates preferably comprise ethylene copolymers that incorporate acid functionality. The ethylene copolymers incorporate from between about 15 weight percent to about 25 weight percent acrylic acids, based on the total weight of the polymer. Acrylic acids include, but are not limited to, acrylic acid, methacrylic acid, itaconic acid, maleic acid, maleic anhydride, fumaric acid, monomethyl maleic acid, and mixtures thereof and most preferably are selected from the group consisting of acrylic acid, methacrylic acid, and mixtures thereof.

Ethylene copolymers used in the polymeric sheets may optionally further comprise other unsaturated comonomers such as acrylates and methacrylates. The other unsaturated comonomers may be selected from the group consisting of methyl acrylate, methyl methacrylate, butyl acrylate, butyl methacrylate, glycidyl methacrylate, vinyl acetate, and mixtures thereof.

The ionomer sheets may further comprise additives, such as thermal stabilizers, ultraviolet (UV) absorbers, UV stabilizers, plasticizers, organic peroxides, adhesion promoters and mixtures or combinations thereof.

The ionomer interlayer has a thickness of about 10 mils (0.25 mm), or greater. The ionomer sheet may have a thickness of about 15 mils (0.38 mm), or greater, based on enhanced penetration strength of the laminates produced therefrom. More preferably, the sheet may have a thickness of about 50 mils (1.25 mm), or greater, based on even further enhanced penetration strength of the laminates produced therefrom. The enhanced penetration strength is necessary to satisfy many of the current mandated requirements for hurricane and threat resistance. Many end-uses in the current environment require the ethylene copolymer interlayer to be even thicker. Interlayers thicker than 60 mils (1.50 mm), 90 mils (2.25 mm), and even thicker than 120 mils (3.00 mm), are becoming common in the marketplace.

Suitable polymeric sheets may be formed by any suitable process, such as extrusion, calendaring, solution casting or injection molding. The polymer sheet can be formed by extrusion.

Preferably, one or both surfaces of the polymeric film may be treated to enhance the adhesion to the coating or to the polymeric sheet or both. This treatment may take any form known within the art, including adhesives, primers, such as silanes, flame treatments, plasma treatments, electron beam treatments, oxidation treatments, corona discharge treatments, chemical treatments, chronic acid treatments, hot air treatments, ozone treatments, ultraviolet light treatments, sand blast treatments, solvent treatments, and the like and combinations thereof.

The difference between a polymeric film and a polymeric sheet is the thickness, but there is no set industry standard as to when a film becomes a sheet. A film has a thickness of about 10 mils (0.25 mm) or less, between about 0.5 mils (0.012 millimeters (mm)), to about 10 mils (0.25 mm), or about 1 mil (0.025 mm) to about 5 mils (0.13 mm).

Adhesives and primers may be used to enhance the bond strength between the laminate layers, if desired, as is generally known in the art. For example, silane coupling agents may be applied to the glass or to the films and sheets to enhance the adhesion between layers. Specific examples of useful silane coupling agents are gamma glycidoxylpropyltrimethoxy silane or gamma-aminopropyltriethoxy silane. Typically, said silane coupling agents are added at a level of about 0.01 to about 5 weight percent based on the total weight of the film or sheet composition or applied to the glass surface. An example of a preferred primer is polyallyl amine. Examples of adhesives are epoxy and siloxane resins. Other additives, including but not limited to antioxidants, ultraviolet absorbers, ultraviolet stabilizers, thermal stabilizers, and colorants, may also be added to ionomeric composition. See, e.g. U.S. Pat. No. 5,190,826.

The polymeric sheets may further comprise additives such as plasticizers, processing aides, flow enhancing additives, lubricants, pigments, dyes, flame retardants, impact modifiers, neucleating agents to increase crystallinity, antiblocking agents such as silica, thermal stabilizers such as, but not limited to those disclosed in U.S. Pat. Nos. 4,325,863; 4,338,244; 5,175,312; 5,216,052; 5,252,643; 5,356,966; 5,367,008; 5,369,159; 5,428,162; 5,428,177; 5,488,117; 5,516,920; 5,607,624; 5,614,572; 5,693,829; 5,773,631; 5,814,692; 6,140,397; 6,521,681; and 6,586,606. See also, DE-A-4316611; DE-A-4316622; DE-A-4316876; EP-A-0589839; and EP-A-0591102, UV absorbers, UV stabilizers, dispersants, surfactants, chelating agents, coupling agents, adhesives, primers and the like.

The term "glass" is meant to include not only window glass, plate glass, silicate glass, sheet glass, and float glass, but also includes colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use. A typical glass is 90 mil thick annealed flat glass.

In order to more fully and clearly illustrate the present invention, the following specific examples are presented. It is intended that the examples be considered as illustrative rather than limiting the invention disclosed and claimed herein. In the examples all parts and percentages are on a weight basis unless otherwise specified.

Example 1

Preparation of Laminate

A cross-linked partially lithium neutralized ethylene-acrylic acid ionomer resin having a melt index of 1.5 according to the invention was added to the resin port of a small extruder having an extruding barrel temperature which was maintained at 325 degrees-400 degrees Fahrenheit. A film was extruded and cut into a twelve inch square of 0.75 mm thickness and stacked between a pair of 1.5 millimeter of chemically strengthened glass plates. The assembly was placed in a so called "polymer" bag of the type disclosed in U.S. Pat. No. 3,311,517 to Keslar et al. The bag comprises an outer ply of polyethylene terephthalate and an inner ply of polyethylene bonded thereto. The bag was inserted into a second bag of the same material, evacuated and sealed. The sealed unit was placed in an autoclave at 255° F. for three minutes under 150-200 psi pressure in a vacuum. The unit was then cooled to room temperature and the pressure reduced. The assembly was removed from the autoclave and the bags and plastic wrapping were removed from the assembly.

The resulting glass window is then ready to insert into a suitable support or frame and secured therein.

Example 2

A series of tests were conducted to determine the resistance to spall with different laminate under the Ball Drop Test.

Test 1

Following the procedure of Example 1, a 12 inch square laminate was prepared with outer layers of a 1.5 mm chemically strengthened glass plate, of a 1.5 mm interlayer of the resin of Example 1.

A 5 inch diameter iron ball was suspended as a pendulum. The laminate was mounted in a vertical position and the ball was pulled back thirty-six inches from the object and permitted to fall and hit the laminate.

The impact rating was 8.

Comparative Example

Test 2

Following the procedure of Example 1, a laminate was prepared wherein the interlayer was an ethylene-methacrylic acid ionomer having 18% methacrylic acid (Dupont 8940) which was partially neutralized with sodium cations.

The resulting laminate was subject to the Ball Drop Test of Example 2.

The impact rating was 6.

Example 3

A modified ball drop test was run which consisted of dropping a five pound steel ball from a height of 28 feet onto a horizonally mounted glass plastic laminate which had been mounted on a steel frame with 55 durometer rubber as a cushion. The sample used had soda lime glass on both sides of the interlayer.

To compare the results a straight edge is placed diagonally across the sample after impact, the amount of deflection from the straight is recorded. The ionomer of Example 1 was tested for ball drop and pummel test.

| % Transmission | Haze | Ball Drop m/m | Pummel |
|---|---|---|---|
| 88.1 | .095 | 12.63 | 7-8-8 |

What is claimed is:

1. In a security glass laminate having at least one layer comprising front and rear tempered or chemically strengthened glass sheets, the improvement which comprises an inter layer of a sodium and lithium partially neutralized ionomer composition free of crystallinity having a melt index of 0.2 to 4 and the adhesion of the laminate to the glass as measured by the Ball Drop Test is at least 8, said ionomer composition consisting of copolymers of ethylene and at least 17% by weight of at least one acrylic acid and methacrylic acid which has been neutralized with a combination of at least 10 mole percent of said lithium salt having less than 1% lithium carbonate combined with sodium cations to neutralize from 15% to 40% of the free carboxyl groups available.

2. The security glass laminate of claim 1 wherein said lithium salt is lithium acetate.

3. The security glass laminate of claim 1 wherein said ionomer composition consists of 18-21% by weight of acrylic acid content.

4. The security glass laminate of claim 1 wherein said ionomer composition comprises 18 to 21% methacrylic acid content.

5. The security glass laminate of claim 1 comprising acrylic acid and methacrylic acid wherein 55-63% of the contained acid groups of an ionomer containing 14-15% methacrylic acid have been neutralized and a diamine is present.

6. The security glass laminate of claim 1 wherein the ionomer is extruded.

7. The security glass laminate of claim 1 which comprises having UV absorption below 380 nm.

* * * * *